United States Patent
Matsuoka et al.

[11] 3,839,684
[45] Oct. 1, 1974

[54] METHOD OF AND MECHANISM FOR ADJUSTING THE OPTICAL AXIS OF A LASER RESONATOR BY TRANSLATIONAL MOVEMENT OF THE RESONATOR REFLECTOR

[75] Inventors: Tohru Matsuoka; Akira Kuroiwa; Isao Kobayashi, all of Tokyo, Japan

[73] Assignee: Nippon Electric Company, Limited, Tokyo, Japan

[22] Filed: Dec. 12, 1972

[21] Appl. No.: 314,463

[30] Foreign Application Priority Data
Dec. 17, 1971   Japan.............................. 46-101874

[52] U.S. Cl............ 331/94.5 C, 350/231, 350/247, 331/94.5 D
[51] Int. Cl............................................. H01s 3/05

[58] Field of Search ............ 331/94.5; 350/231, 247

[56] References Cited
UNITED STATES PATENTS

| | | | |
|---|---|---|---|
| 2,533,628 | 12/1950 | Rosenberg | 350/247 X |
| 3,062,100 | 11/1962 | Ludewig et al. | 350/231 |
| 3,432,771 | 3/1969 | Hardy | 331/94.5 |
| 3,620,603 | 11/1971 | White et al. | 350/247 |

Primary Examiner—John K. Corbin
Assistant Examiner—Robert J. Webster
Attorney, Agent, or Firm—Sandoe, Hopgood & Calimafde

[57] ABSTRACT

A laser resonator includes at least one reflector having a spherical reflecting surface. The optical axis of the resonator is adjusted by translating the reflector along a plane tangential to its spherical surface.

12 Claims, 6 Drawing Figures

METHOD OF AND MECHANISM FOR ADJUSTING THE OPTICAL AXIS OF A LASER RESONATOR BY TRANSLATIONAL MOVEMENT OF THE RESONATOR REFLECTOR

BACKGROUND OF THE INVENTION

This invention relates to a laser comprising an optical resonator and, more particularly, to an improved method of adjusting the optical axis of the resonator, a laser having an improved mechanism for adjusting the optical axis of the resonator, and to an improved laser comprising an optical resonator havingg an accurately adjustable optical axis.

It has been the practice to adjust the optical axis of the resonator either by means of gimbals or by a three-point supporter. The adjustment is delicate, being of the order of one milliradian, occasionally 0.1 milliradian or less, and requires a precise mechanism and an excellent skill. With gimbals having an arm length of five centimeters and a micrometer head for the fine adjustment, the stroke of the micrometer head must be five microns in order to attain the resolution of 0.1 milliradian. It is to be noted here that the conventional mechanisms for adjusting the optical axis of the resonator resort to adjustment of the inclination of at least one reflector contained in the resonator, namely, the angle formed by the optical axes of the reflector and the remainder of the resonator. This requires very exact mechanical processing to achieve fine adjustment of the angle.

SUMMARY OF THE INVENTION

It is therefore an object of the present invention to provide, for a laser comprising an optical resonator, a method of and a mechanism for finely adjusting the optical axis of the resonator, even permitting an appreciable amount of manual adjustment.

It is another object of this invention to provide for a laser comprising an optical resonator including at least one reflector a method of and a mechanism for precisely adjusting the optical axis of the resonator without adjusting the inclination of the reflector.

It is still another object of this invention to provide a laser comprising an optical resonator having an accurately adjustable optical axis.

According to an aspect of this invention there is provided for a laser comprising an optical resonator, a method of adjusting the optical axis of said resonator, said resonator including at least one reflector having a substantially sphericcal reflecting surface, wherein the improvement comprises the step of translating said reflector along a tangential to its spherical surface.

According to another aspect of this invention there is provided a laser comprising an optical resonator including at least one reflector having a substantially spherical reflecting surface, wherein the improvement comprises means for adjusting the optical axis of said resonator by translating said reflector with a predetermined plane tangential to its spherical surface.

According to a further aspect of this invention, there is provided a laser comprising an optical resonator including at least one reflector having a substantially spherical reflecting surface, the optical axis of said resonator being adjusted by translating said reflector within a predetermined plane.

In accordance with this invention, it has been found that translation of the reflector along a plane is equivalent to a change in the inclination of the optical axis of the reflector and that the translation of an appreciable amount corresponds to the change in inclination of a very small amount. It is therefore easy to attain delicate adjustment of the optical axis of the reflector to provide an exactly optically axially adjusted resonator.

DESCRIPTION OF THE PREFERRED EMBODIMENTS

Figure 1:
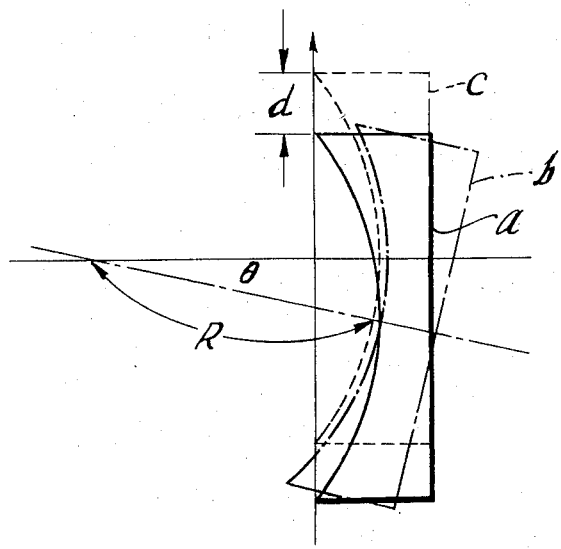
FIG. 1 is a diagram which illustrates the principles of the instant invention.

Referring to FIG. 1, it should be noted that a laser to which the present invention is applicable comprises an optical resonator (not shown herein) including at least one reflector. The reflector herein illustrated in axial section and in three typical positions $a$, $b$, and $c$ has a substantially spherical concave reflecting surface (of which the radius of curvature is R). It may be assumed that a reflector which happens to be in the position $a$ can not provide a preferable result and that the reflector inclined to the position $b$ by an angle $\theta$ gives the best result. In other words, the optical axis of the resonator is not adjusted as desired with the reflector in the position $a$, while the spherical surface of the reflector brought into position $b$ is the best spherical surface for the reflector of the laser. It has now been found that the reflector, if translated from the position $a$ by a distance $d$ to the position $c$ with the plane of the boundary kept in that determined by the boundary of the reflector placed in the position $a$, provides the same spherical surface as that given by the reflector brought into the best position $c$. The relation between the displacement $d$ and the angle $\theta$ is $$d = R\theta,$$

where R is usually of a value between several scores of centimeters and several meters, giving a very small angle $\theta$ even with an appreciable displacement $d$. For example, the angle $\theta$ for a laser including a reflector for which $R = 1$ m becomes 0.1 milliradian when $d = 0.1$ mm. It is therefore easy with this invention to achieve delicate adjustment of the optical axis of the resonator.

Figure 2:
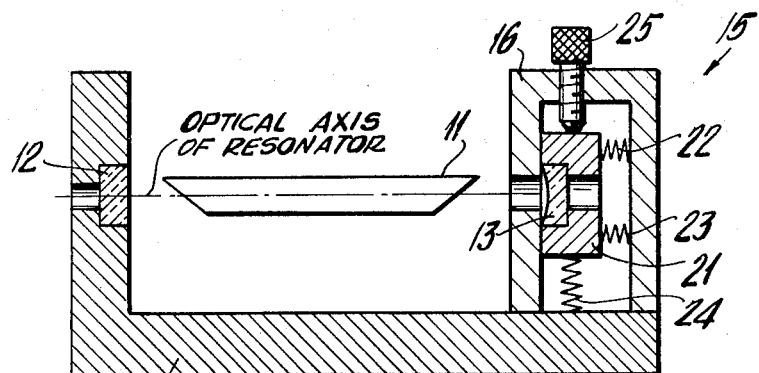
FIG. 2 is a vertical sectional view of a first embodiment of this invention.

FIG. 2 shows a laser to which this invention is applicable. The laser includes an optical resonator comprising a gas laser tube 11 filled with a gaseous mixture of helium and neon and provided with a pair of Brewster windows, a plane reflector 12 disposed opposite to one of the Brewster windows and perpendicular to the optical axis of the laser tube 11, and a spherical reflector 13 placed opposite to the other of the Brewster windows with its optical axis in predetermined relation to the optical axis of the laser tube 11. The laser further includes an optical bench 14 for supporting the laser tube 11 in a desired position with means not shown. It also includes provision for supporting the plane reflector 12 with setscrews (not shown) or the like, and a mechanism 15 mounted on the bench for adjustably holding the spherical reflector 13. In accordance with a first embodiment of this invention, the mechanism 15 includes a flat plate member 16 defining a planar surface fixed to the optical bench 14 perpendicular to the optical axis of the resonator, a slidable member 21 carrying the spherical reflector 13, a plurality of substantially axially disposed coil springs, such as 22 and 23, urging the slidable member 21 against the plate 16, a plurality of radially disposed coil springs, such as 24, radially inwardly urging the slidable member 21, and three adjusting screws, such as 25, for translating the slidable member 21 against the opposing radial springs along the plate 16. It is to be noted here that the spherical reflector 13 or the spherical reflecting surface thereof has a substantially circular boundary. In case the boundary is of an irregular form, such as a a major arc and a chord (in orthogonal projection), a circle contacting the irregular boundary is considered herein a substantially circular boundary bounding the substantially spherical reflecting surface in outline.

Further referring to FIG. 2, the flat plate 16 and the slidable member 21 may be provided with interlocking grooves (not shown) on the respective contacting surfaces in order to render the translation more smooth. Each adjusting screw 25 may be replaced by a micrometer head (not shown). The flat plate 16 may not be fixed to the optical bench 14 but may be pivoted thereon. This enables the initial rough adjustment of the optical axis of the resonator to be carried out by adjusting the inclination of the optical axis of the spherical reflector 13. When the optical axis of the resonator is held vertically with the slidable member 21 placed on the upwardly facing flat plate 16, the axial coil springs may be dispensed with.

With this invention, it is far easier to translate the spherical reflector 13 to an optimum position than with the conventional mechanism whereby the adjustment must be carried out in two intersecting planes. With the optical axis of the resonator held upright and with the slidable member 21 engaging the flat plate 16 without any axial or radial coil springs, it has been confirmed that it is easy to generate laser oscillation. Because a rotational mechanism is not necessary, the spherical reflector 13 is held firmly, particularly against mechanical vibration.

Figure 3:
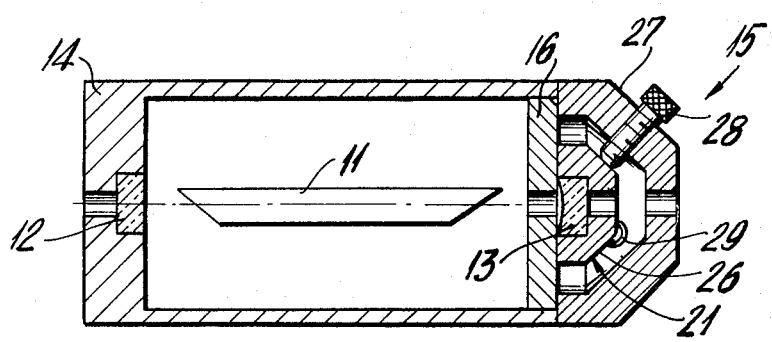
FIG. 3 is a similar view of a second embodiment of this invention.

Referring to FIG. 3, the optical resonator of a laser is enclosed within a hollow cylindrical optical bench 14 as is often the case. In this second embodiment of this invention comprising similar components illustrated with like reference numerals as in FIG. 2, the adjusting mechanism 15 comprises a slidable member 21 which is now of a cylindrical shape having a bevelled end surface 26, an end wall having a portion 27 axially flaring substantially parallel to the bevelled surface 26 and three azimuthally substantially equally spaced threaded holes, and three machine screws, such as 28 and 29, put into the threaded holes and holding the slidable member 21 against the flat plate 16 at the bevelled surface 26. With this embodiment, it will readily be seen that the laser oscillation is more stable against mechanical shock and vibrations than with the first embodiment.

The second embodiment is therefore suitable for use in machining, civil engineering, and the like. Either the entire adjusting mechanism 15 or the end wall having the flared portion 27 may be manufactured separately from the hollow cylindrical optical bench 14 and fixed thereto by screws (not shown) or any other suitable means. This makes it easy to replace the spherical reflector 13.

Figure 4:
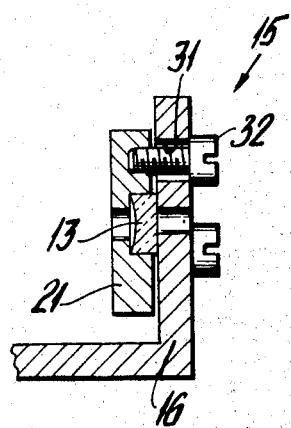
FIG. 4 is a like view of the mechanism for adjusting the reflector according to a second embodiment of this invention.

Referring to FIG. 4, the adjusting mechanism 15 for a laser according to a third embodiment of this invention comprises a flat plate 16 having three clearance holes, such as 31, arcuately substantially equally spaced approximately about the optical axis of the spherical reflector 13, a slidable member 21 having a central indentation for receiving the spherical reflector 13 and three threaded indentations at positions corresponding to the clearance holes, and three machine screws, such as 32, projecting through the clearance holes and screwed into the respective threaded indentations. The flat plate 16 thus holds the spherical reflector 13 at the circular boundary of the spherical reflecting surface with the back side of the spherical reflector 13 pushed against the flat plate 16 which defines a planar surface obliquely intersecting the optical axis of the resonator. In this case it is desired that the back side of the spherical reflector 13 be flat. With this embodiment, it is easy to replace the spherical reflector 13. When the axis of the adjusting mechanism 15 is held upright with the slidable member 21 placed on the flat plate 16 interposing the spherical reflector 13 therebetween by gravity rather than by means of the machine screws and the cooperating clearance holes and threaded indentation, both adjustment and replacement of the spherical reflector 13 become easier.

Figure 5:
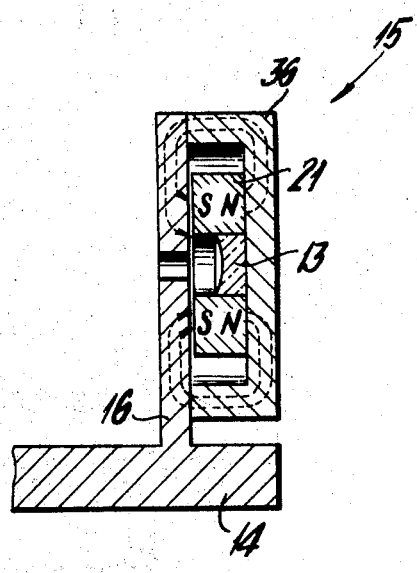
FIG. 5 shows a side view of a similar mechanism according to a third embodiment of this invention, partly in vertical section.

Referring to FIG. 5, the adjusting mechanism 15 for a laser according to a fourth embodiment of this invention comprises a flat plate 16 made of a ferromagnetic material, such as iron, nickel, an iron-nickel-cobalt alloy generally known by a trade name "Invar," or the like, a torus-shaped slidable member 21 made of a ferromagnetic material, such as ferrite, forming axially disposed permanent magnet and snugly receiving the spherical reflector 13, and a cup-shaped end piece 36 attached to the flat plate 16 by means not shown enclosing the slidable member 21. With a hole (not shown) provided through the end wall 36 at a portion which the magnetic lines of force (depicted with dashed lines) do not pass through, it is possible to manually translate the spherical reflector 13 parallel to the flat plate 16. The cup-shaped end wall 36 may be dispensed with. Alternatively, a rotary knob, such as used in the sophisticated magnetic chucks available on the market, may be used to close and break the magnetic circuit. With this latter modification, it is possible to translate the spherical reflector 13 with the magnetic circuit broken and to fix the same in position with the magnetic circuit closed. This provides ideal adjustment of the orientation of the spherical reflector 13 because the undesired displacement of the reflector 13 after it is put into position is infinitesimal before and after closure of the magnetic circuit.

Figure 6:
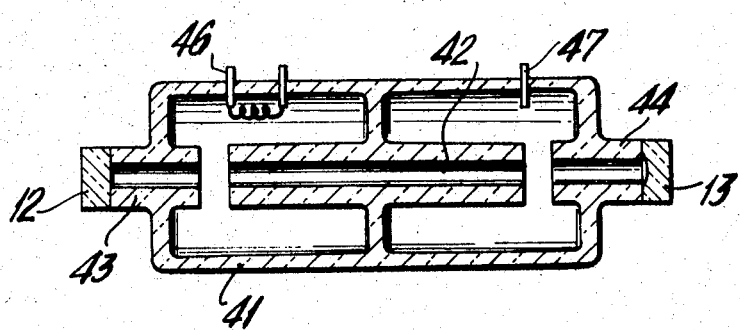
FIG. 6 is a vertical sectional view of a fourth embodiment of this invention.

Referring finally to FIG. 6, a laser according to a fifth embodiment of this invention is of the so-called internal mirror type and comprises a hollow cylindrical vacuum envelope 41 which in turn includes a plasma capillary 42 extending along the axis thereof and a pair of tubes 43 and 44 aligned with the capillary 42 and extending through the respective end walls of the envelope 41 both inwardly and outwardly thereof. The plane and the spherical reflectors 12 and 13 are hermetically attached to those open outward ends of the respective tubes 43 and 44 which are substantially perpendicular to the laser axis. The fifth embodiment further comprises a cathode 46 and an anode 47 hermetically extending as shown and a laser active substance, such as a mixture of helium and neon, filling the internal space of the envelope 41. The operation of the fifth embodiment as a laser is known in the art. According to the fifth embodiment, the position of the spherical reflector 13 is adjusted before hermetically attaching the same to the associated tube 44 by translating the same along the outward end surface of the tube 44. Preferably, the spherical reflector 13 is provided with a flat plane margin contiguous to and surrounding the spherical concave reflecting surface. This renders the translation smooth and lengthens the vacuum leak path. In addition, this protects the spherical reflecting surface against any damage which might otherwise be caused to the reflecting surface during adjustment. The flat plane margin and the associated outward end surface of the tube 44 may be polished to provide the so-called optical contact to further insure airtightness.

While this invention has thus far been described in conjunction with several embodiments and modifications thereof, it is apparent that it is equally applicable to other gas lasers, such as an argon-ion laser, a carbon dioxide laser, and the like. This invention is also applicable to a solid-state laser, such as a YAG laser, and a liquid-state laser. Instead of resorting to a separable slidable member 16, the spherical reflector 13 by itself may be placed against the flat plate 16 in the embodiments illustrated with reference to FIGS. 2 through 5. The adjusting mechanism 15 of these embodiments may be removed away from the laser after the optical axis of the resonator is adjusted. The spherical reflector 13 may be a spherical convex reflector. The flat reflector 12 may be a spherical concave or convex reflector. In this event, either or both of the reflectors 12 and 13 may be adjusted according to this invention. This invention is furthermore applicable to a laser having three or more reflectors, such as a laser comprising a composite resonator, provided that at least one of the reflectors has a spherical reflecting surface. As mentioned too in connection with the modification of the first embodiment, the reflector may be translated along a plane that is not perpendicular to the optical axis of the resonator. It will be readily appreciated that an upward translation of the reflector in any of the accompanying drawings corresponds to a counterclockwise tilting of the optical axis of the reflector in the plane of the drawing and that a downward translation of the reflector corresponds to a clockwise tilting of the optical axis thereof.

This invention should not be deemed limited to the specific arrangements described herein, as many additional variations and modifications thereof will occur to those skilled in the art. The scope of the invention is not limited except by the appended claims.

What is claimed is:

1. In a laser, an optical resonator including a first reflector, a laser active medium and a second reflector that has a fixed position while operational and has a substantially spherical reflecting surface, wherein the improvement comprises means for adjusting the fixed position of the second reflector to align the optical axis of the resonator by translational movement of said second reflector along a plane tangential to its reflecting surface.

2. In a laser, an optical resonator including a first reflector, a laser active medium and a second reflector that has a fixed position while operational and has a substantially spherical reflecting surface, wherein the improvement comprises means for adjusting the fixed position of the second reflector to align the optical axis of the resonator by translational movement of said second reflector along a plane tangential to its reflecting surface, said adjusting means including a member that defines a planar surface for guiding the second reflector at a predetermined angle to the optical axis of the resonator.

3. A laser including an optical resonator comprising a laser active medium and a first reflector wherein the improvement comprises a second reflector having a substantially spherical reflecting surface that is movable with respect to said first reflector along a predetermined plane tangential to said first reflector to adjust the optical axis of the resonator and adjusting means for holding said reflector in a preselected adjustable position with respect to said plane, said second reflector facing said first reflector with said laser active element interposed between said first and second reflectors.

4. A method of adjusting the optical axis of the resonator of a laser wherein the resonator includes at least one reflector with a substantially spherical reflecting surface that has a normally fixed position while in operation, said method comprising the step of causing translational movement of the reflector along a plane tangential to said reflecting surface of the reflector.

5. The apparatus of claim 2, wherein said planar surface is substantially horizontal, upwardly facing, and engaged by said second reflector.

6. The apparatus of claim 2, wherein said planar surface is parallel to said tangential plane, said member defining the planar surface being engaged by said second reflector.

7. The apparatus of claim 2, wherein said adjusting means includes at least one screw means for urging the second reflector along the planar surface and spring means for resiliently urging the reflector against the screw means.

8. The apparatus of claim 7, further comprising additional screw means for urging the second reflector against said planar surface.

9. The apparatus of claim 2, wherein the adjusting means further comprises screw means for urging the second reflector along a plane obliquely intersecting the optical axis of the resonator.

10. The apparatus of claim 2, wherein the adjusting means further comprises at least one screw means substantially parallel to the optical axis of the resonator.

11. The apparatus of claim 2, the adjusting means further comprises means for magnetically urging the second reflector against the planar surface and substantially in the direction of the optical axis of the resonator.

12. The apparatus of claim 3, wherein said second reflector includes a member defining a planar surface contiguous to its reflecting surface to facilitate movement of said second reflector by said adjusting means along a plane tangential to its spherical surface.

* * * * *